United States Patent
Zhang

(10) Patent No.: US 12,538,352 B2
(45) Date of Patent: Jan. 27, 2026

(54) COMMUNICATION METHOD AND USER EQUIPMENT

(71) Applicant: GUANGDONG OPPO MOBILE TELECOMMUNICATIONS CORP., LTD., Dongguan (CN)

(72) Inventor: Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 499 days.

(21) Appl. No.: 17/723,868

(22) Filed: Apr. 19, 2022

(65) Prior Publication Data

US 2022/0248471 A1 Aug. 4, 2022

Related U.S. Application Data

(63) Continuation of application No. PCT/CN2020/121807, filed on Oct. 19, 2020.

(30) Foreign Application Priority Data

Oct. 19, 2019 (WO) ................ PCT/CN2019/112064

(51) Int. Cl.
*H04W 74/0808* (2024.01)
*H04W 74/0833* (2024.01)

(52) U.S. Cl.
CPC ... *H04W 74/0808* (2013.01); *H04W 74/0833* (2013.01)

(58) Field of Classification Search
CPC .......... H04W 74/0833; H04W 74/006; H04W 74/0808
See application file for complete search history.

(56) References Cited

U.S. PATENT DOCUMENTS

| 2021/0051672 A1* | 2/2021 | Rastegardoost .... H04W 74/006 |
| 2021/0084683 A1* | 3/2021 | Li ..................... H04W 74/0808 |
| 2021/0100030 A1* | 4/2021 | Myung ............. H04W 74/0808 |

(Continued)

FOREIGN PATENT DOCUMENTS

| CN | 110291835 A | 9/2019 |
| CN | 110351876 A | 10/2019 |
| JP | 2022521326 A | 4/2022 |

(Continued)

OTHER PUBLICATIONS

First Office Action issued in corresponding Chinese application No. 202210827764.2, mailed Jul. 14, 2023.

(Continued)

*Primary Examiner* — Sulaiman Nooristany

(74) *Attorney, Agent, or Firm* — BAYES PLLC

(57) ABSTRACT

A communication method being applied to a user equipment (UE) and includes: obtaining a first indication indicating at least one of possible random access channel (RACH) occasion (RO) positions, actual transmitted synchronization signal block (SSB) positions, frame based equipment (FBE) frame period (FFP) information, or uplink/downlink (UL/DL) pattern within the FFP; obtaining a second indication indicating channel occupancy time (COT) information; and determining, based on the first indication and the second indication, valid RO for physical RACH (PRACH) transmission.

14 Claims, 4 Drawing Sheets

(56) References Cited

U.S. PATENT DOCUMENTS

2021/0298072 A1* 9/2021 Oh .................. H04W 72/0446
2021/0385863 A1* 12/2021 Fan .................. H04W 74/0841

FOREIGN PATENT DOCUMENTS

| WO | 2019104299 A1 | 5/2019 |
| WO | 2019/139407 A1 | 7/2019 |
| WO | 2020169071 A1 | 8/2020 |

OTHER PUBLICATIONS

Notice of Allowance issued in corresponding European application No. 20876563.6, mailed Aug. 24, 2023.

Extended European Search Report issued in corresponding European application No. 20876563.6, mailed Oct. 19, 2022.

Intel Corporation, "Channel access mechanism for NR-unlicensed", R1-1906785, 3GPP TSG RAN WG1 Meeting #97 Reno, Nevada, USA, May 13-17, 2019.

International Search Report issued in corresponding International Application No. PCT/CN2020/121807, mailed Jan. 19, 2021, 22 pages.

Written Opinion of the International Searching Authority issued in corresponding International Application No. PCT/CN2020/121807, mailed Jan. 19, 2021, 4 pages.

"Enhancements to Initial Access Procedure for NR-U", Agenda item: 7.2.2.2.2, Source: Samsung, 3GPP TSG RAN WG1 Meeting #98bis, R1-1910460, Chongqing, China, Oct. 14-Oct. 20, 2019, 13 pages.

"PRACH and paging resource enhancement for NR-U", Agenda item: 7.2.2.2.2, Source: Panasonic, 3GPP TSG RAN WG1 #98bis, R1-1910564, Chongqing, China, Oct. 14-20, 2019, 6 pages.

First Office Action issued in corresponding Japanese application No. 2022-523251, mailed Jun. 21, 2024.

Source: Samsung; Title: Frame structure for NR-U 3GPP TSG RAN WG1 Meeting #94bis R1-1812974 Spokane, USA, Nov. 12-16, 2018.

* cited by examiner

COMMUNICATION METHOD AND USER EQUIPMENT

CROSS-REFERENCE TO RELATED APPLICATION

This is a continuation application of International Application No. PCT/CN2020/121807, entitled "COMMUNICATION METHOD AND USER EQUIPMENT" filed on Oct. 19, 2020, which claims the priority benefit of PCT Application No. PCT/CN2019/112064, filed Oct. 19, 2019, the contents of which are incorporated herein by reference in their entirety.

TECHNICAL FIELD

The present application relates to communication system and, more particularly, to a communication method and a user equipment.

BACKGROUND

The random access channel (RACH) occasion (RO) determination and PRACH transmission over RO in frame based equipment (FBE) mode is still an open question. The present disclosure provides a method for determining the valid RO and how does UE determine if one RO is allowed for PRACH transmission.

SUMMARY

Embodiments of the present application provide a communication method and a user equipment.

These embodiments include a communication method, being applied to a user equipment (UE) and including: obtaining a first indication indicating at least one of possible random access channel (RACH) occasion (RO) positions, actual transmitted synchronization signal block (SSB) positions, frame based equipment (FBE) frame period (FFP) information, or uplink/downlink (UL/DL) pattern within the FFP; obtaining a second indication indicating channel occupancy time (COT) information; and determining, based on the first indication and the second indication, valid RO for physical RACH (PRACH) transmission.

These embodiments also include a communication method, being applied to a user equipment (UE) and including: determining a random access channel (RACH) occasion (RO) within a concerned frame based equipment (FBE) frame period (FFP) is allowed for PRACH transmission, if the RO is a valid RO in the concerned FFP; and there is at least one downlink (DL) signal or channel has been detected prior to the RO within the concerned FFP.

These embodiments further include a user equipment. The user equipment includes: a memory storing instructions; and a processor communicatively coupled to the memory, wherein the instructions, when executed by the processor, cause the processor to perform operations including: obtaining a first indication indicating at least one of possible random access channel (RACH) occasion (RO) positions, actual transmitted synchronization signal block (SSB) positions, frame based equipment (FBE) frame period (FFP) information, or uplink/downlink (UL/DL) pattern within the FFP; obtaining a second indication indicating channel occupancy time (COT) information; and determining, based on the first indication and the second indication, valid RO for physical RACH (PRACH) transmission.

These embodiments further include a user equipment. The user equipment includes: a memory storing instructions; and a processor communicatively coupled to the memory, wherein the instructions, when executed by the processor, cause the processor to perform operations including: determining a random access channel (RACH) occasion (RO) within a concerned frame based equipment (FBE) frame period (FFP) is allowed for PRACH transmission, if the RO is a valid RO in the concerned FFP; and there is at least one downlink (DL) signal or channel has been detected prior to the RO within the concerned FFP.

These embodiments further include a non-transitory computer-readable medium storing instructions that are executable by one or more processors of a user equipment to perform a communication method, the communication method including: obtaining a first indication indicating at least one of possible random access channel (RACH) occasion (RO) positions, actual transmitted synchronization signal block (SSB) positions, frame based equipment (FBE) frame period (FFP) information, or uplink/downlink (UL/DL) pattern within the FFP; obtaining a second indication indicating channel occupancy time (COT) information; and determining, based on the first indication and the second indication, valid RO for physical RACH (PRACH) transmission.

These embodiments also include a non-transitory computer-readable medium storing instructions that are executable by one or more processors of a user equipment to perform a communication method, the communication method including: determining a random access channel (RACH) occasion (RO) within a concerned frame based equipment (FBE) frame period (FFP) is allowed for PRACH transmission, if the RO is a valid RO in the concerned FFP; and there is at least one downlink (DL) signal or channel has been detected prior to the RO within the concerned FFP.

It is to be understood that the foregoing general description and the following detailed description are exemplary and explanatory only, and are not restrictive of the disclosure, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented.

The implementations set forth in the following description of exemplary embodiments do not represent all implementations consistent with the disclosure. Instead, they are merely examples of apparatuses and methods consistent with aspects related to the disclosure as recited in the appended claims.

Figure 1:
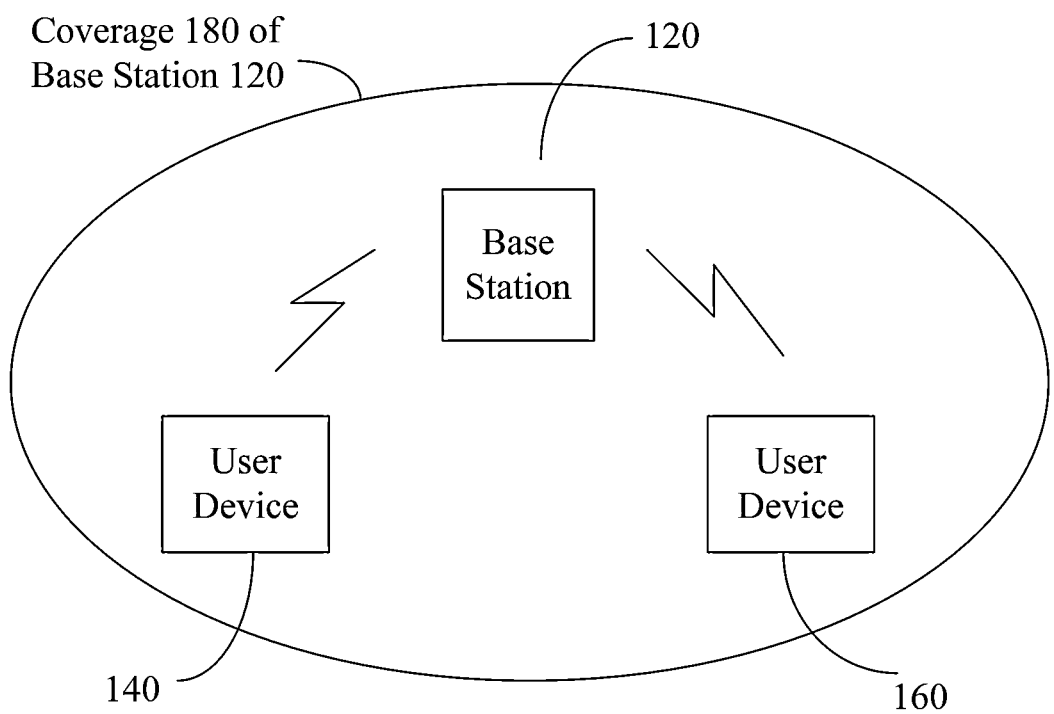
FIG. 1 illustrates an exemplary wireless communication system, according to some embodiments of the present application.

FIG. 1 illustrates an exemplary wireless communication system, consistent with embodiments of the present application. The wireless communication system includes a base station 120, a user device 140, and a user device 160. Base station 120 is an end node of a wireless communication network.

For example, base station 120 may be an evolved node B (eNB) in an LTE system or a gNB in a 5G radio system. Base station 120 transmits radio signals carrying system information of the wireless communication system. A user device within a coverage 180 around base station 120 receives the system information.

For example, user device 140 within coverage 180 receives the system information, and can access network services through base station 120.

Each of user devices 140 and 160 is a mobile terminal in the wireless communication network.

For example, user device 140 or 160 may be a smart phone, a network interface card, or a machine type terminal. As another example, user device 140 or 160 may be a user equipment in the LTE system or the 5G radio system.

Each of user devices 140 and 160 and base station 120 contain communication units that can transmit and receive radio signals. The following description discusses aspect of operating user device 140 in the wireless communication system, it being understood that such description also applies to user device 160.

When user device 140 intends to access network services through base station 120, user device 140 may need to receive control signals from base station 120 to collect system information with coverage 180, such as synchronization and radio resource allocation and schedule.

For example, user device 140 in the 5G radio system may need to receive a physical downlink control channel (PDCCH) to learn whether any data in a physical downlink shared channel is transmitted to user device 140. Accordingly, user device 140 needs to detect a PDCCH among signals transmitted by base station 120.

A 5G radio system, for example, uses OFDM waveform for wireless communications. As in existing LTE cellular networks, communications are measured in time frames, each frame being divided into slots, and each slot containing multiple OFDM symbols each spanning over the multiple frequency subcarriers. Resources are defined in time (OFDM symbols) and frequency (subcarriers).

A PDCCH search space is a set of resources that a user device, e.g., 140, may assume as its PDCCH candidates and attempt to search and decode to obtain control information. Without loss of generality, for a user device, the instances of resources where PDCCHs are configured to be transmitted (or the instances that the user device is configured to monitor its PDCCH) are called scheduling (or PDCCH) instances hereinafter.

User device 140 may conduct blind decoding of all the PDCCH instances in its search space until it successfully decodes its PDCCH candidate. Once PDCCH is successfully decoded, user device 140 proceeds to receive and decode data transmitted from the base station on a data channel such as a physical downlink shared channel (PDSCH).

If user device 140 fails to decode a PDCCH in its search space, user device 140 may assume no PDCCH is transmitted at that scheduling instance and may not decode its PDSCH.

The 5G radio system may be deployed at a higher frequency (e.g., above 6 GHz), at which wide bandwidths are available. Beamforming (BF), for example, can be adopted to improve signal strength and reduce interference in the radio system.

Following are exemplary description to related terms in the art.

Unlicensed Band

The unlicensed spectrum is a shared spectrum. The communication equipment in different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum.

For example, the communication device follows the principle of "Listen Before Talk (LBT)", that is, the device needs to perform channel sensing before transmitting the signal on the channel. Only when the LBT outcome shows that the channel is idle, the device can perform signal transmission; otherwise, the device cannot perform signal transmission. In order to ensure fairness, once a device successfully occupies the channel, the transmission duration cannot exceed the Maximum Channel Occupancy Time (MCOT).

On the unlicensed carrier, for the channel occupation time obtained by the base station, it may share the channel occupation time to the UE for transmitting the uplink signal or the uplink channel. In other words, when the base station shares its own channel occupancy time with the UE, the UE can use the LBT mode with higher priority than that used by the UE itself to obtain the channel, thereby obtaining the channel with greater probability.

Frame Based Equipment (FBE)

FBE is a channel access mode for unlicensed band, where the initiating device has to initiate the COT at a certain period. This mode was not supported in LTE LAA, eLAA, FeLAA.

Physical Random Access Channel (PRACH) in NRU

In unlicensed band, there is a regulation imposing that for every transmission in a 20 Mhz band, the actual transmission has to ensure at least 80% of the bandwidth usage, aka., Occupancy channel bandwidth (OCB) requirement. For an NRU system with 30 Khz subcarrier space, if the network configures 48 RB initial BWP (i.e. 17.28 Mhz bandwidth), and if the UE reuses Rel.15 PRACH over one selected RO (1 RO=360 Khz bandwidth).

Thus, the OCB requirement is not satisfied. To solve this OCB issue, the UE has to transmit PRACH over multiple frequency domain ROs, e.g. transmit over RO #0, 1, 2, 3 simultaneously or over RO #0, 3, simultaneously.

Note that the OCB regards the bandwidth between lowest frequency up to the highest frequency of the transmission, which does not impose a transmission without gap in the transmission spectrum. Thus, transmission over RO #0-3 is equivalent to over RO #0, 3.

To sum up, the RO determination and PRACH transmission over RO in FBE mode is still an open question. Following description provides a method for determining the valid RO and how does UE determine if one RO is allowed for PRACH transmission.

Figure 2:
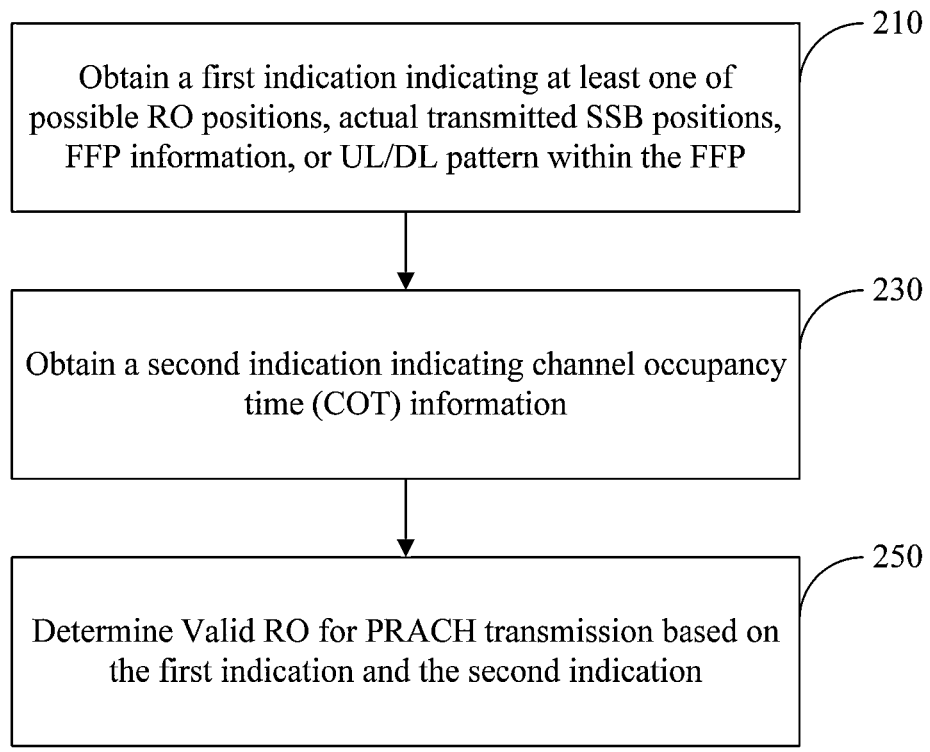
FIG. 2 is a flowchart of an exemplary communication method 200 according to some embodiments of the present application.

FIG. 2 is a flowchart of an exemplary communication method 200 according to some embodiments of the present application. Method 200 may be practiced by user device 140 or 160. Method 200 includes following steps.

In step 210, a first indication indicating at least one of possible random access channel (RACH) occasion (RO) positions, actual transmitted synchronization signal block (SSB) positions, frame based equipment (FBE) frame period (FFP) information, or uplink/downlink (UL/DL) pattern within the FFP is obtained.

In step 230, a second indication indicating channel occupancy time (COT) information is obtained In step 250, valid RO is determined for physical RACH (PRACH) transmission based on the first indication and the second indication.

In an embodiment, the valid RO satisfies at least one of:
being not within a pre-defined range related to the transmitted SSB;
not overlapping or partially overlapping with resource in which DL transmission is configured; or
not entering an FFP idle part.

In an embodiment, the FFP idle part is a remaining part between the FFP and COT of the FFP.

In an embodiment, the second indication is included in cell-specific configuration or pre-stored with respect to a system frame number.

Figure 3:
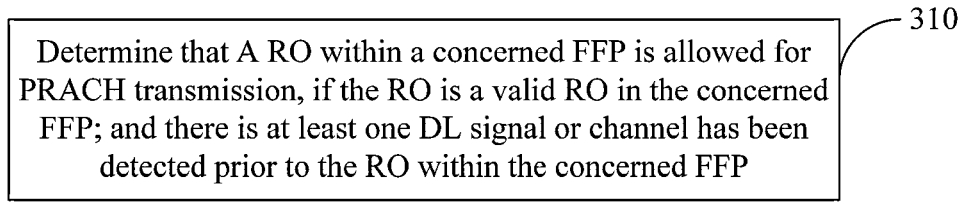
FIG. 3 is a flowchart of an exemplary communication method 300 according to some embodiments of the present application.

FIG. 3 is a flowchart of an exemplary communication method 300 according to some embodiments of the present application. Method 300 may be practiced by user device 140 or 160. Method 300 includes following steps.

In step 310, a random access channel (RACH) occasion (RO) within a concerned frame based equipment (FBE) frame period (FFP) is determined as being allowed for PRACH transmission, if:
the RO is a valid RO in the concerned FFP; and
there is at least one downlink (DL) signal or channel has been detected prior to the RO within the concerned FFP.

In an embodiment, the DL signal includes at least one of synchronization signal block (SSB) or downlink reference signal.

In an embodiment, the DL channel includes at least one of physical downlink control channel (PDCCH) or physical downlink shared channel (PDSCH).

In an embodiment, Method 300 further includes performing an LBT type for transmission PRACH over the allowed RO.

In an embodiment, the LBT type is indicated by cell-specific configuration (e.g., SIB1) or pre-defined.

In an embodiment, the LBT type is Category 1 or Category 2 or Category 4.

Following are implementation examples according to some embodiments of the present application. These examples may be adopted in the 5G NR non-licensed band communications.

Example 1

Figure 4:
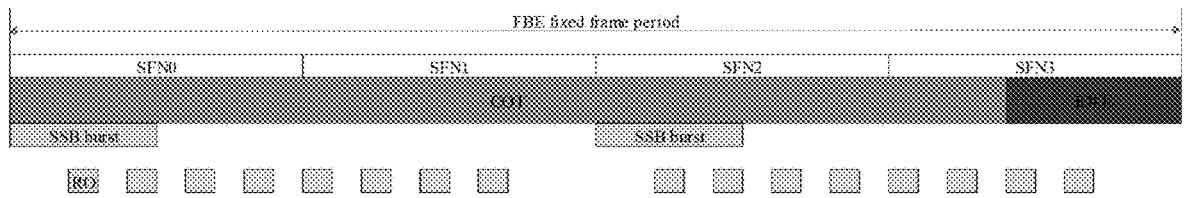
FIG. 4 exemplarily illustrates the information about the FFP, COT, SSB position, RO position, DL/UL patterns obtained by UE.

FIG. 4 exemplarily illustrates the information about the FFP, COT, SSB position, RO position, DL/UL patterns obtained by UE. In an embodiment.

Based on the information as shown in FIG. 4, once the UE receives information about the FFP and COT information, the UE may derive the FFP idle part by subtracting COT from FFP. Moreover, when the UE receives the SSB positions, DL/UL patterns, RO positions, UE may have a full knowledge of the relative positions among these resources as shown in FIG. 4.

Figure 5:
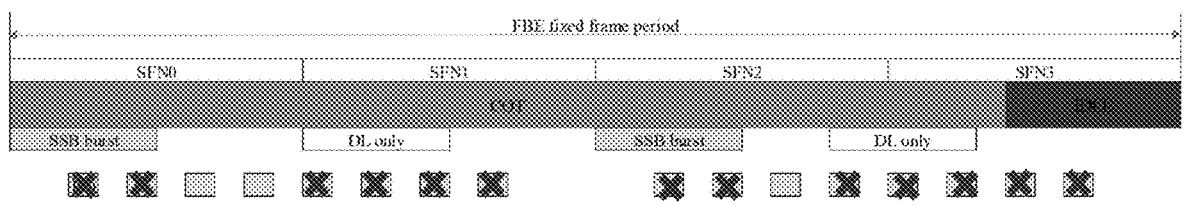
FIG. 5 exemplarily illustrates that UE determines the valid RO from all RO positions, based on FFP, COT, SSB position, RO position, DL/UL patterns.

In the next step, UE may determine the valid RO among all RO positions, such that the RO are not overlapped with the resources that are configured for downlink transmissions, and SSB transmissions. Moreover, the valid ROs should not overlap with the FFP idle part as shown in FIG. 5, which exemplarily illustrates that UE determines the valid RO from all RO positions, based on FFP, COT, SSB position, RO position, DL/UL patterns.

Example 2

When UE determines the valid RO, and when the UE wants to transmit PRACH over the valid RO, the UE has to determine whether this valid RO can be actually used for PRACH transmission by verifying, if prior to this valid RO, since the beginning of the current FFP, UE has detected any downlink transmission within this period of time. The downlink transmission may be any defined DL transmission, e.g., SSB, PDSCH, PDSCH, downlink reference signal. Once the DL transmission is detected, all the valid RO after this valid RO up to the end of the FFP will be determined as the RO over which PRACH transmission can be performed.

Figure 6:
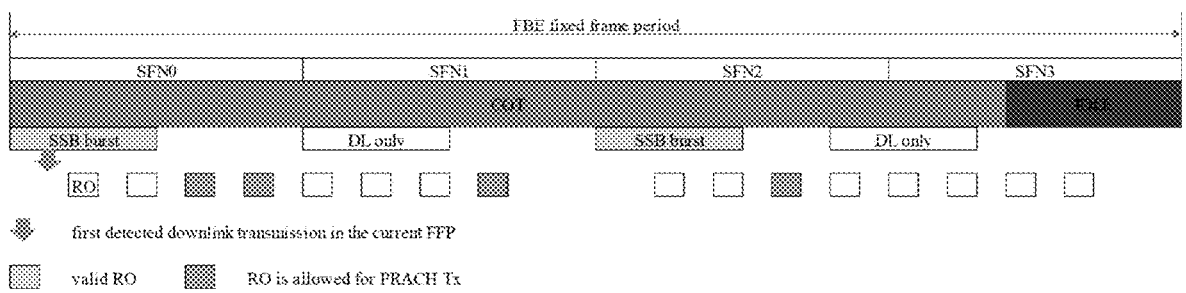
FIG. 6 exemplarily illustrates that UE determines which valid RO can be used for actual PRACH transmission, based on the reception/detection of the downlink transmission prior to the valid RO, which is intended for PRACH transmission) within the current FFP.

FIG. 6 exemplarily illustrates that UE determines which valid RO can be used for actual PRACH transmission, based on the reception/detection of the downlink transmission prior to the valid RO, which is intended for PRACH transmission) within the current FFP.

Figure 7:
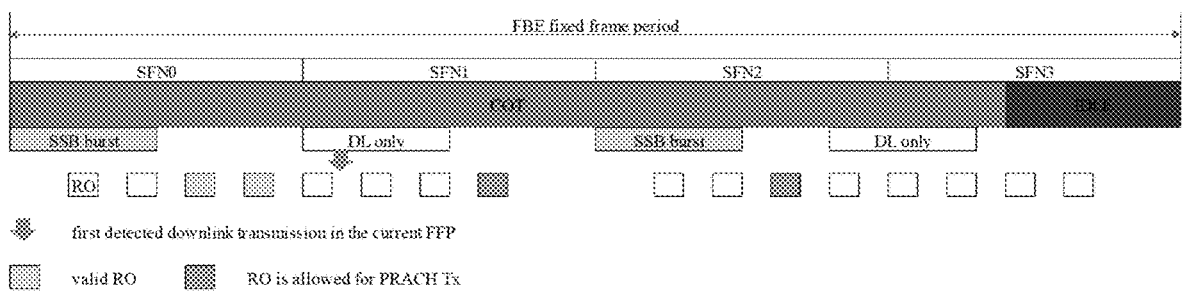
FIG. 7 exemplarily illustrates that UE determines which valid RO can be used for actual PRACH transmission, based on the reception/detection of the downlink transmission prior to the valid RO, which is intended for PRACH transmission) within the current FFP.

FIG. 7 exemplarily illustrates that UE determines which valid RO can be used for actual PRACH transmission, based on the reception/detection of the downlink transmission prior to the valid RO, which is intended for PRACH transmission) within the current FFP.

Based on the illustration of FIG. 6 and FIG. 7, when UE performs PRACH transmission, UE may use LBT type which is signaled in the cell-specific configuration (e.g., LBT Category 1 or Category 2 with gap being 16 or 25 us). In another embodiment, the LBT type may be pre-defined as well as the gap.

Figure 8:
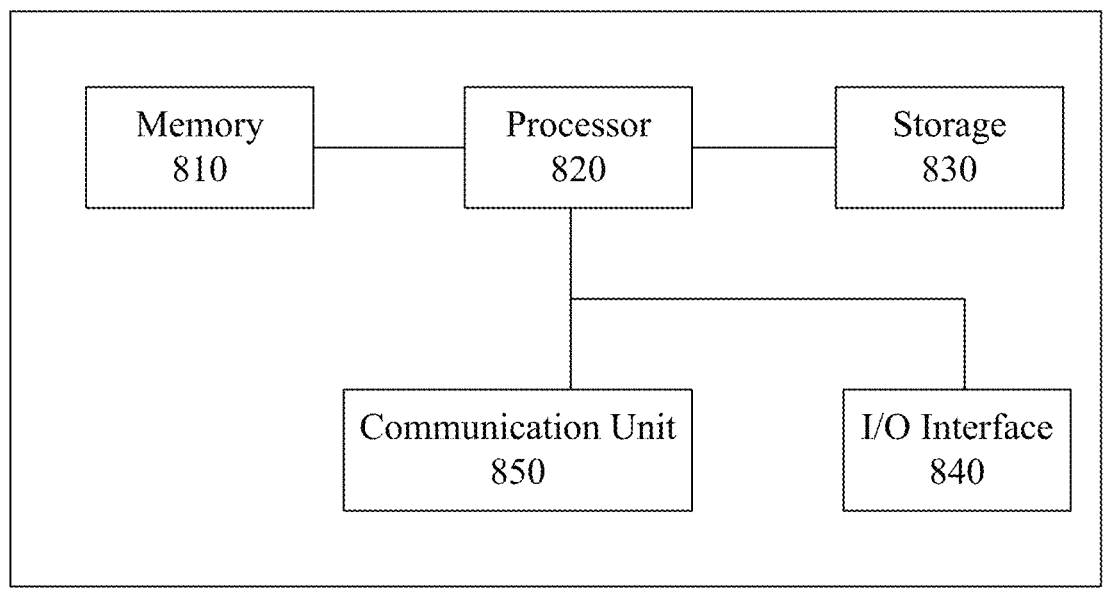
FIG. 8 is a schematic diagram of an exemplary user equipment 800 according to some embodiments of the present application.

FIG. 8 is a schematic diagram of an exemplary user equipment 800 according to some embodiments of the present application. User equipment 800 1600 includes a memory 810, a processor 820, a storage 830, an I/O interface 840, and a communication unit 850. One or more of these elements of user equipment 800 may be included for performing any embodiment of the communication method as described above. User device 140 or 160 shown in FIG. 1 may be configured as user equipment 800. Processor 820 includes any appropriate type of general-purpose or special-purpose microprocessor, digital signal processor, or microcontroller. Processor 820 can be one of processors in user device 140 or 160. Memory 810 and storage 830 may include any appropriate type of mass storage provided to store any type of information that processor 820 may need to operate. Memory 810 and storage 830 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 810 and/or storage 830 may be configured to store one or more programs for execution by processor 820 to perform any embodiment of the communication method, as disclosed herein.

Memory 810 and/or storage 830 may be further configured to store information and data used by processor 820.

I/O interface 840 may be configured to facilitate the communication between user equipment 800 and other apparatuses.

For example, I/O interface 840 may receive a signal from another apparatus (e.g., a base station) including system configuration information for user equipment 800. I/O interface 840 may also output data of transmitting statistics to other apparatuses.

Communication unit 850 may include one or more cellular communication modules, including, for example, a 5G radio system, a Long-Term Evolution (LTE), a High Speed Packet Access (HSPA), a Wideband Code-Division Multiple Access (WCDMA), and/or a Global System for Mobile communication (GSM) communication module.

Processor 820 can be configured to performs operations including: obtaining a first indication indicating at least one of possible random access channel (RACH) occasion (RO) positions, actual transmitted synchronization signal block (SSB) positions, frame based equipment (FBE) frame period (FFP) information, or uplink/downlink (UL/DL) pattern within the FFP; obtaining a second indication indicating channel occupancy time (COT) information; and determining, based on the first indication and the second indication, valid RO for physical RACH (PRACH) transmission.

In an embodiment, the valid RO satisfies at least one of: being not within a pre-defined range related to the transmitted SSB; not overlapping or partially overlapping with resource in which DL transmission is configured; or not entering an FFP idle part.

In an embodiment, the FFP idle part is a remaining part between the FFP and COT of the FFP.

In an embodiment, the second indication is included in cell-specific configuration or pre-stored with respect to a system frame number.

Processor 820 can be also configured to performs operations including: determining a random access channel (RACH) occasion (RO) within a concerned frame based equipment (FBE) frame period (FFP) is allowed for PRACH transmission, if the RO is a valid RO in the concerned FFP; and there is at least one downlink (DL) signal or channel has been detected prior to the RO within the concerned FFP.

In an embodiment, the DL signal includes at least one of synchronization signal block (SSB) or downlink reference signal.

In an embodiment, the DL channel includes at least one of physical downlink control channel (PDCCH) or physical downlink shared channel (PDSCH).

In an embodiment, processor 820 can be further configured to performs operations including: performing an LBT type for transmission PRACH over the allowed RO.

In an embodiment, the LBT type is indicated by cell-specific configuration or pre-defined.

In an embodiment, the cell-specific configuration includes SIB1.

In an embodiment, the LBT type is Category 1 or Category 2 or Category 4.

Another aspect of the disclosure is directed to a non-transitory computer-readable medium storing instructions which, when executed, cause one or more processors to perform methods, consistent with the embodiments disclosed herein.

The computer-readable medium may include volatile or non-volatile, magnetic, semiconductor, tape, optical, removable, non-removable, or other types of computer-readable medium or computer-readable storage devices.

For example, the computer-readable medium may be a storage device or a memory module having the computer instructions stored thereon, as disclosed.

In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. A communication method, being applied to a user equipment (UE) and comprising:
    obtaining a first indication indicating all possible random access channel (RACH) occasion (RO) positions, actual transmitted synchronization signal block (SSB) positions, frame based equipment (FBE) frame period (FFP) information, and uplink/downlink (UL/DL) pattern within the FFP;
    obtaining a second indication indicating channel occupancy time (COT) information, wherein the second indication is included in cell-specific configuration with respect to a system frame number; and
    determining, based on the first indication and the second indication, valid RO for physical RACH (PRACH) transmission, wherein the valid RO satisfies not entering an FFP idle part, being not within the actual transmitted SSB positions, and not overlapping or partially overlapping with resource in which DL transmission is configured,
    wherein the FFP idle part is a remaining part between the FFP and the COT of the FFP, and
    the method further comprises: if there is at least one DL signal or channel has been detected prior to a first RO within the FFP, determining to allow the PRACH transmission over the first RO.

2. A user equipment, comprising:
    a memory storing instructions; and
    a processor communicatively coupled to the memory,
    wherein the instructions, when executed by the processor, cause the processor to perform operations including:
    obtaining a first indication indicating all possible random access channel (RACH) occasion (RO) positions, actual transmitted synchronization signal block (SSB) positions, frame based equipment (FBE) frame period (FFP) information, and uplink/downlink (UL/DL) pattern within the FFP;
    obtaining a second indication indicating channel occupancy time (COT) information, wherein the second indication is included in cell-specific configuration with respect to a system frame number; and
    determining, based on the first indication and the second indication, valid RO for physical RACH (PRACH) transmission, wherein the valid RO satisfies not entering an FFP idle part, being not within the actual transmitted SSB positions, and not overlapping or partially overlapping with resource in which DL transmission is configured, wherein the FFP idle part is a remaining part between the FFP and the COT of the FFP, and wherein the operations further comprise: if there is at least one DL signal or channel has been detected prior to a first RO within the FFP, determining to allow the PRACH transmission over the first RO.

3. The method according to claim 1, wherein the DL signal comprises at least one of SSB or downlink reference signal.

4. The method according to claim 1, wherein the DL channel comprises at least one of physical downlink control channel (PDCCH) or physical downlink shared channel (PDSCH).

5. The method according to claim 1, further comprising: performing a listen before talk (LBT) type for the transmission PRACH over the first RO.

6. The method according to claim 5, wherein the LBT type is indicated by the cell-specific configuration or pre-defined.

7. The method according to claim 6, wherein the cell-specific configuration comprises system information block (SIB1).

8. The method according to claim 5, wherein the LBT type is Category 1 or Category 2 or Category 4.

9. The user equipment according to claim 2, wherein the DL signal comprises at least one of SSB or downlink reference signal.

10. The user equipment according to claim 2, wherein the DL channel comprises at least one of physical downlink control channel (PDCCH) or physical downlink shared channel (PDSCH).

11. The user equipment according to claim 2, wherein the operations further comprise:

performing a listen before talk (LBT) type for the transmission PRACH over the first RO.

12. The user equipment according to claim 11, wherein the LBT type is indicated by the cell-specific configuration or pre-defined.

13. The user equipment according to claim 12, wherein the cell-specific configuration comprises system information block (SIB1).

14. The user equipment according to claim 11, wherein the LBT type is Category 1 or Category 2 or Category 4.

* * * * *